US009797637B2

(12) United States Patent
Shimazu

(10) Patent No.: US 9,797,637 B2
(45) Date of Patent: Oct. 24, 2017

(54) REFRIGERATION CYCLE APPARATUS

(71) Applicant: Mitsubishi Electric Corporation, Tokyo (JP)

(72) Inventor: Yusuke Shimazu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 267 days.

(21) Appl. No.: 14/427,864

(22) PCT Filed: Oct. 3, 2013

(86) PCT No.: PCT/JP2013/076916
§ 371 (c)(1),
(2) Date: Mar. 12, 2015

(87) PCT Pub. No.: WO2014/065094
PCT Pub. Date: May 1, 2014

(65) Prior Publication Data
US 2015/0211772 A1    Jul. 30, 2015

(30) Foreign Application Priority Data
Oct. 26, 2012 (JP) ................. 2012-237185

(51) Int. Cl.
*F25B 40/02* (2006.01)
*F25B 41/04* (2006.01)
*F25B 49/02* (2006.01)

(52) U.S. Cl.
CPC ............ *F25B 40/02* (2013.01); *F25B 41/043* (2013.01); *F25B 49/02* (2013.01); *F25B 2400/13* (2013.01);
(Continued)

(58) Field of Classification Search
CPC ....................................... F25B 40/02
See application file for complete search history.

(56) References Cited

U.S. PATENT DOCUMENTS

2012/0247146 A1   10/2012   Yamada et al.
2013/0098086 A1*  4/2013    Sillato .............. F25B 49/02
                                                    62/184
(Continued)

FOREIGN PATENT DOCUMENTS

JP    2001-033110 A    2/2001
JP    2006-090563 A    4/2006
(Continued)

OTHER PUBLICATIONS

Kojima, JP 2012-021744, dated Feb. 2, 2012, machine translation.*
(Continued)

*Primary Examiner* — Frantz Jules
*Assistant Examiner* — Mark L Greene
(74) *Attorney, Agent, or Firm* — Posz Law Group, PLC

(57) ABSTRACT

A refrigeration cycle apparatus includes a compressor, a condenser, a first subcooling device that subcools a refrigerant by exchanging heat with the air, a second subcooling device that performs a heat exchange between refrigerant streams that have been branched by a branch pipe, thereby subcooling one of the refrigerant streams, a flow control device that adjusts a flow rate of the second stream of the refrigerant and passes this refrigerant through the second subcooling device, a bypass path that allows the refrigerant passing through the flow control device and the second subcooling device to flow therethrough, an expansion valve, an evaporator, and a controller configured to control an amount of heat exchanged in the first subcooling device and an amount of heat exchanged in the second subcooling device based on a temperature of the air.

11 Claims, 7 Drawing Sheets

(52) U.S. Cl.
CPC ..... *F25B 2400/16* (2013.01); *F25B 2600/021* (2013.01); *F25B 2600/025* (2013.01); *F25B 2600/111* (2013.01); *F25B 2600/2509* (2013.01); *F25B 2600/2513* (2013.01); *F25B 2700/2103* (2013.01); *F25B 2700/2106* (2013.01); *F25B 2700/2108* (2013.01); *Y02B 30/741* (2013.01); *Y02B 30/743* (2013.01)

(56) References Cited

U.S. PATENT DOCUMENTS

| | | | | |
|---|---|---|---|---|
| 2013/0098102 A1* | 4/2013 | Nakayama | ................ | F25B 1/10 62/510 |
| 2016/0238271 A1* | 8/2016 | Kimura | ................... | F25B 13/00 |

FOREIGN PATENT DOCUMENTS

| | | | | |
|---|---|---|---|---|
| JP | 2009-109065 A | 5/2009 | | |
| JP | 2010-071614 A | 4/2010 | | |
| JP | WO 2012008479 A1 * | 1/2012 | ................ | F25B 1/10 |
| JP | 2012-021744 A | 2/2012 | | |
| WO | 2011/135616 A1 | 11/2011 | | |

OTHER PUBLICATIONS

Nishide, JP 2010-071614, dated Apr. 2, 2010, machine translation.*
Extended European Search Report issued on Nov. 16, 2015 in the corresponding EP application No. 13848275.7.
International Search Report of the International Searching Authority dated Dec. 17, 2013 for the corresponding international application No. PCT/JP2013/076916 (and English translation).

\* cited by examiner

F I G. 1
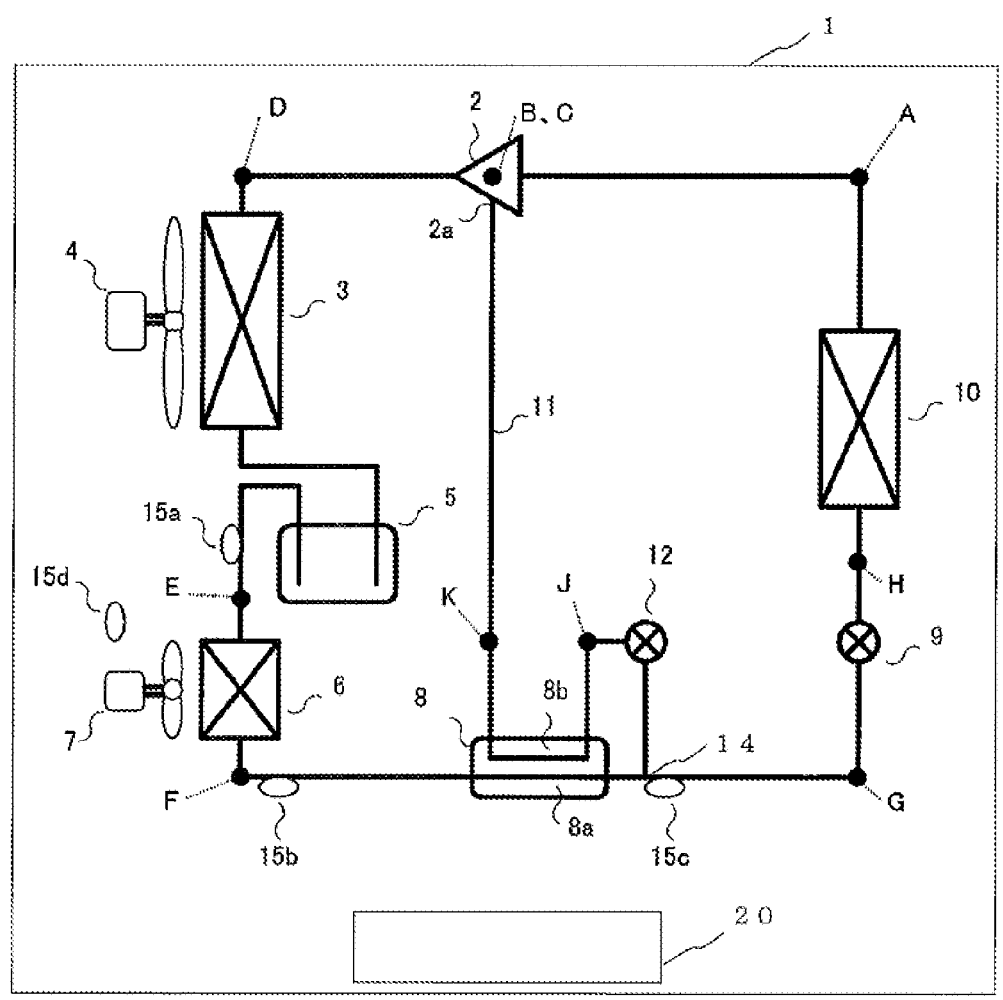

F I G. 6
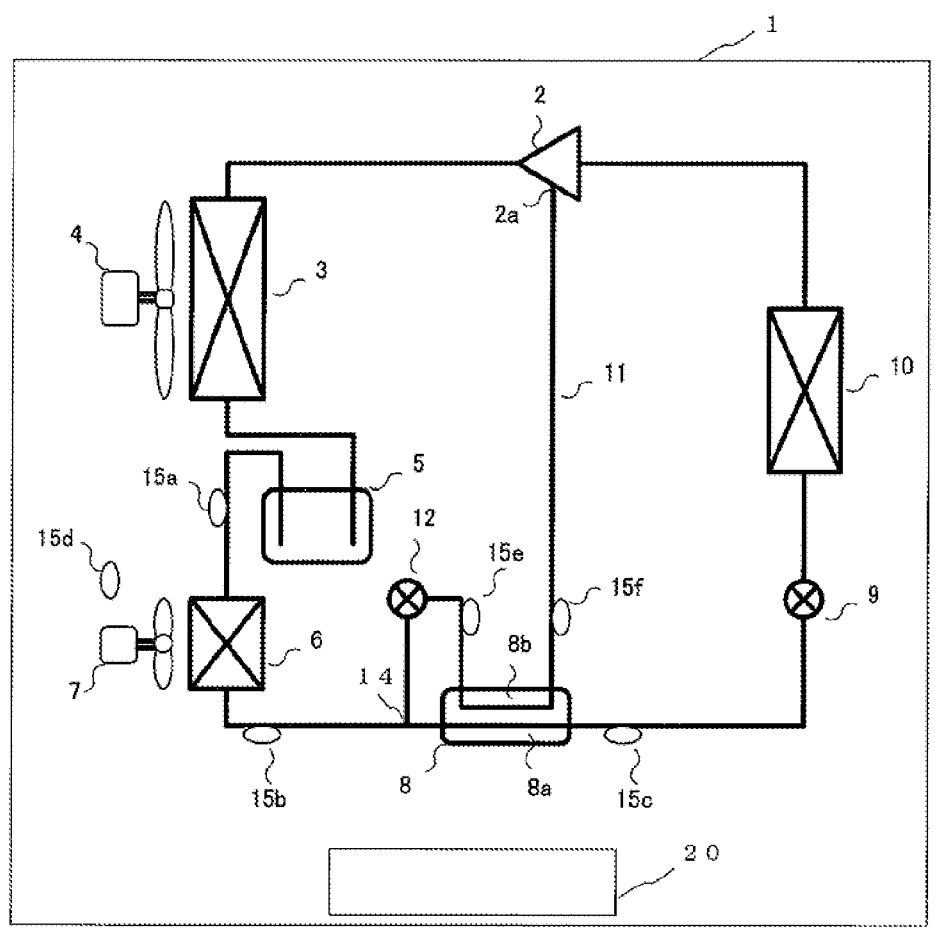

REFRIGERATION CYCLE APPARATUS

CROSS REFERENCE TO RELATED APPLICATION

This application is a U.S. national stage application of International Application No. PCT/JP2013/076916 filed on Oct. 3, 2013, and is based on Japanese Patent Application No. 2012-237185 filed on Oct. 26, 2012, the disclosures of which are incorporated by reference.

TECHNICAL FIELD

The present invention relates to refrigeration cycle apparatuses. In particular, it relates to a refrigeration cycle apparatus that includes two types of heat exchangers of an air heat exchanger and a refrigerant-refrigerant heat exchanger to bring refrigerant into a subcooling state.

BACKGROUND ART

An example of a known refrigeration machine for refrigerating and freezing purposes (refrigeration apparatus) being a refrigeration cycle apparatus includes a fundamental refrigerant circuit in which a compressor, condenser, expansion valve, and evaporator are connected in sequence by pipes. It may have a configuration that further includes a subcooling device disposed between the condenser and expansion valve. In that configuration, the refrigerant is further cooled from a saturated liquid to subcooled state, thereby increasing an enthalpy difference in the evaporator, enhancing the capability, and improving the performance or the like. Examples of the means for subcooling the refrigerant may include an air heat exchanger that causes heat exchange between the air and refrigerant and a refrigerant-refrigerant heat exchanger that causes heat exchange between refrigerants. There is a refrigeration cycle apparatus including a refrigerant circuit having these heat exchangers (see, for example, Patent Literatures 1 and 2).

CITATION LIST

Patent Literature

Patent Literature 1: Japanese Unexamined Patent Application Publication No. 2009-109065 (p. 4, FIG. 1)
Patent Literature 2: Japanese Unexamined Patent Application Publication No. 2012-21744 (p. 3, FIG. 1)

SUMMARY OF INVENTION

Technical Problem

The refrigeration cycle apparatus described in Patent Literature 1 uses the refrigerant-refrigerant heat exchanger for the purpose of adjusting the capability of the refrigeration machine and ensures reliability of the compressor in a range where the operating capacity is small. The refrigeration cycle apparatus described in Patent Literature 2 uses the refrigerant-refrigerant heat exchanger for the purpose of adjusting high pressure and controls the high pressure with stability in accordance with the operation conditions.

The refrigeration cycle apparatus in each of Patent Literatures mentioned above conducts the operation using the refrigerant-refrigerant heat exchanger for the individual purpose, but does not exercise control of the amount of heat exchanged (subcooling control) enabling efficient operation with the air heat exchanger.

It is an object of the invention to provide a refrigeration cycle apparatus capable of conducting high-efficiency operation.

Solution to Problem

A refrigeration cycle apparatus according to the invention includes a compressor, a condenser, a first subcooling device, a second subcooling device, flow control means, a bypass pipe, pressure reducing means, an evaporator, and a controller. The compressor is configured to compress refrigerant. The condenser is configured to condense the refrigerant. The first subcooling device is configured to cause heat exchange between the refrigerant and air and to subcool the refrigerant. The second subcooling device is configured to cause heat exchange between first and second streams of the refrigerant obtained by branching by a branch pipe for causing the refrigerant to branch off and to subcool the first stream of the refrigerant relating to the branching. The flow control means is configured to adjust a flow rate of the second stream of the refrigerant relating to the branching and to cause the second stream of the refrigerant to flow through the second subcooling device. The bypass pipe allows the refrigerant passing through the flow control means and the second subcooling device to flow therethrough. The pressure reducing means is configured to reduce pressure of the refrigerant. The evaporator is configured to cause the refrigerant to evaporate. The controller is configured to control an amount of heat exchanged in the first subcooling device and an amount of heat exchanged in the second subcooling device based on a temperature of the air. The compressor, the condenser, the first subcooling device, the second subcooling device, the flow control means, the bypass pipe, the pressure reducing means, and the evaporator are connected by a refrigerant pipe and constitute a refrigerant circuit.

Advantageous Effects of Invention

According to the invention, because the controller controls the amount of heat exchanged in the first subcooling device and the amount of heat exchanged in the second subcooling device in accordance with the outdoor air temperature, it can suppress an input in accordance with the operation conditions and can achieve high-efficiency operation.

BRIEF DESCRIPTION OF DRAWINGS

FIG. 1 illustrates a configuration of a refrigeration cycle apparatus according to Embodiment 1 of the invention.

FIG. 6 illustrates a configuration of a refrigeration cycle apparatus according to Embodiment 2 of the invention.

DESCRIPTION OF EMBODIMENTS

Embodiment 1

Figure 2:
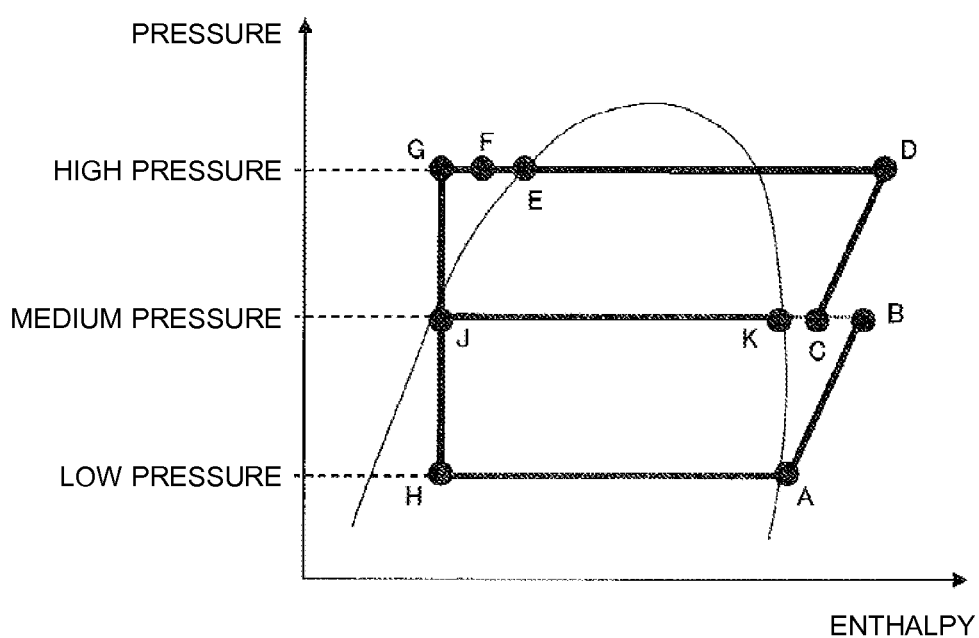
FIG. 2 is a p-h diagram of a refrigeration cycle in a refrigeration apparatus 1 according to Embodiment 1 of the invention.

FIG. 1 illustrates a configuration of a refrigeration cycle apparatus according to Embodiment 1 of the invention. Embodiment 1 of the invention is described below. In Embodiment 1, the refrigeration apparatus 1 is described as a typical example of the refrigeration cycle apparatus. Here, the relationships in size between the components in the drawings, including FIG. 1, may be different from the actual ones. In the drawings, including FIG. 1, the same reference numerals indicate the same or equivalent elements, and this applies throughout the description. The forms of the components described in the description are merely illustrative and are not limited to the described ones. Being high or low in temperature, pressure, and the like are not defined by relationships with particular absolute values, but are relatively defined in states, actions, and the like in system, apparatus, and the like.

The refrigeration apparatus 1 in Embodiment 1 includes a main refrigerant circuit in which a compressor 2, a condenser 3, a reservoir 5, a first subcooling device 6, a second subcooling device 8, an expansion valve 9, and an evaporator 10 are connected by refrigerant pipes. The refrigeration apparatus 1 further includes a condenser fan 4 and a first subcooling device fan 7. The refrigeration apparatus 1 accommodates all of these devices here, but may also be configured as a set of a plurality of housings. For example, the evaporator 10 may be accommodated in a different housing and connected by a pipe.

The compressor 2 is configured to suck refrigerant, compress it into a high-temperature and high-pressure gas state, and discharge it. Here, the compressor 2 in Embodiment 1 includes an injection pipe 2a for use in injecting (introducing) the refrigerant into a compressing chamber (not illustrated). The compressor 2 may be of the type capable of controlling its rotation speed using, for example, an inverter circuit or the like and adjusting the amount of discharging refrigerant. The condenser 3 is configured to cause heat exchange between the refrigerant compressed by the compressor 2 and, for example, air outside the structure (outdoor air) and to condense and liquefy the refrigerant. The condenser fan 4 is configured to deliver the outdoor air to the condenser 3 and to facilitate the heat exchange with the refrigerant flowing through the condenser 3. The reservoir 5 is configured to store an excess of the refrigerant inside the refrigerant circuit.

The first subcooling device 6 includes an air heat exchanger configured to cause heat exchange between air (outdoor air in Embodiment 1) and the refrigerant. The first subcooling device fan 7 is configured to deliver the outdoor air to the first subcooling device 6 and facilitate heat exchange with the refrigerant flowing in the first subcooling device 6. The first subcooling device fan 7 can control its rotation speed using an inverter circuit or the like and adjust the quantity of outdoor air to be delivered to the first subcooling device 6.

The second subcooling device 8 includes a refrigerant-refrigerant heat exchanger configured to cause heat exchange between refrigerants. The second subcooling device 8 includes a first path 8a and a second path 8b. The first path 8a is a path for the refrigerant flowing in the main refrigerant circuit side. The second path 8b is a path for the refrigerant flowing in a bypass channel side. In Embodiment 1, a branch pipe 14 is connected between the second subcooling device and the expansion valve 9. The branch pipe 14 causes a stream of the refrigerant that has passed through the first path 8a in the second subcooling device 8 to branch off from the main refrigerant circuit, makes the refrigerant portion pass through the second path 8b, and causes heat exchange between the refrigerant streams. The configuration of the bypass channel side is described below.

The expansion valve 9 is a pressure reducing device (expansion device) and is configured to reduce the pressure of the refrigerant that has passed through the second subcooling device 8.

The expansion valve 9 can adjust the pressure and the flow rate of the refrigerant by changing its opening degree. The evaporator 10 is configured to cause heat exchange between, for example, air to be cooled in the refrigeration apparatus 1 and the refrigerant decompressed by the expansion valve 9, make the refrigerant take the heat away from the air, and cause the refrigerant to evaporate and gasify. Here, one expansion valve 9 and one evaporator 10 are illustrated in FIG. 1. For example, a plurality of combinations of expansion valves 9 and evaporators 10 connected in parallel by pipes may also be used.

Next, the configuration of the bypass channel side is described. The bypass channel side includes a bypass path 11 and a flow control valve 12. The flow control valve 12 is a bypass flow control device. The bypass path (bypass pipe) 11 connects the injection pipe 2a and the second subcooling device 8 (second path 8b) in Embodiment 1. The refrigerant exiting from the second subcooling device 8 is made to flow into the compressor 2 through the injection pipe 2a. The flow control valve 12, which is the bypass flow control device, is configured to reduce the pressure of the refrigerant made to flow in the bypass channel side by the branch pipe 14 and to adjust the flow rate. Then the refrigerant is made to pass through the second path 8b in the second subcooling device 8.

Temperature sensors 15a to 15d are temperature detecting means. Each of the temperature sensors 15a to 15d is configured to detect a temperature in its location. In Embodiment 1, the temperature sensor 15a is disposed between the reservoir 5 and the first subcooling device 6 (on the refrigerant flow inlet of the first subcooling device 6). The temperature sensor 15b is disposed between the first subcooling device 6 and the second subcooling device 8 (on the refrigerant flow outlet of the first subcooling device 6). The temperature sensor 15c is disposed on the refrigerant flow outlet of the second subcooling device 8. The temperature sensor 15d is disposed in a location where it can detect the temperature of the outdoor air (air).

A controller 20 is configured to control devices included in the refrigeration apparatus 1 on the basis of, for example, temperatures and the like relating to detection by the temperature sensors 15a to 15d. In Embodiment 1, the controller 20 is configured to set a target value of the degree of subcooling on the refrigerant flow outlet of each of the first subcooling device 6 and the second subcooling device 8 and to calculate the degree of subcooling on the refrigerant flow outlet of each of the first subcooling device 6 and the second subcooling device 8 in order to adjust the amount of heat exchanged in the first subcooling device 6 and that in the second subcooling device 8 to a ratio based on the outdoor air. The controller 20 is configured to perform subcooling control of controlling the flow control valve 12 and the first subcooling device fan 7. Here, the controller 20 may include, for example, a plurality of time measuring means (timers or the like), each of which can measure (count) time.

FIG. 2 is a p-h diagram of a refrigeration cycle in the refrigeration apparatus 1 according to Embodiment 1 of the invention. First, actions in the refrigeration apparatus 1 of Embodiment 1 are described, and the description focuses on the flow of the refrigerant. Here, points A to K in FIG. 2 correspond to points A to K in FIG. 1. The expressions of high pressure, medium pressure, and low pressure used in the description here are not exact and are the ones based on broad classification of the pressures of the refrigerant in the refrigerant circuit.

The compressor 2 compresses sucked refrigerant (point A) in an inside compression chamber (not illustrated) and discharges it. The refrigerant relating to the discharge is high-temperature and high-pressure superheated gas (point D). Here, an intermediate section of the compression chamber is opened. The refrigerant during the compression (point B) merges with incoming refrigerant through the injection pipe 2a (point K) in a compression stroke, compresses the refrigerant relating to the merging (point C), and discharges it.

The refrigerant exchanging heat with the outdoor air conveyed by the condenser fan 4 in the condenser 3 is condensed into high-pressure saturated liquid (point E). The saturated liquid refrigerant passes through the reservoir 5 and reaches the first subcooling device 6. The refrigerant exchanging heat with the outdoor air conveyed by the first subcooling device fan 7 in the first subcooling device 6 becomes high-pressure subcooled liquid (point F).

The refrigerant passes through the first path 8a in the second subcooling device 8 and branches in refrigerant that is to reach the expansion valve 9 and refrigerant that is to reach the flow control valve 12. The refrigerant flowing toward the flow control valve 12 is decompressed by passing through the flow control valve 12. At this time, the refrigerant becomes a medium-pressure two-phase gas-liquid state (point J), and it passes through the second path 8b in the second subcooling device 8 in a lower temperature state than the refrigerant before passing through the flow control valve 12. Here, in the second subcooling device 8, the refrigerant passing through the first path 8a and the refrigerant passing through the second path 8b exchange heat with each other. At this time, the refrigerant passing through the first path 8a is cooled by the refrigerant passing through the second path 8b, reduces its temperature from that in a state before it passes through the first path 8a, and increases the degree of subcooling (point G). The refrigerant flowing toward the expansion valve 9 passes through the expansion valve 9 and becomes a low-pressure two-phase state (point H). Then the refrigerant exchanges heat with inside air conveyed by an evaporator fan (not illustrated) in the evaporator 10, and it is directed to the compressor 2 in a low-pressure saturated gas or superheated gas state (point A).

In contrast, the refrigerant passing through the second path 8b in the second subcooling device 8 is heated by the refrigerant passing through the first path 8a (point K). At this time, the refrigerant is in a medium-pressure two-phase gas-liquid state having a high quality or medium-pressure superheated gas state. The refrigerant passes through the bypass path 11 and reaches the injection pipe 2a, and, in the compression chamber in the compressor 2, it merges with the refrigerant sucked in the compressor 2 (point C), as previously described.

The refrigeration apparatus 1 in Embodiment 1 includes various types of sensors (detecting means). For example, the temperature sensor 15a is configured to detect the refrigerant temperature between the condenser 3 and the first subcooling device 6, the temperature sensor 15b is configured to detect the refrigerant temperature between the first subcooling device 6 and the second subcooling device 8, and the temperature sensor 15c is configured to detect the refrigerant temperature among the second subcooling device 8, the expansion valve 9, and the flow control valve 12. The temperature sensor 15d is configured to detect the temperature of the outdoor air (outdoor air temperature). The operation conditions in the refrigeration apparatus 1 change depending on various factors, and the refrigerant required for the operation changes in accordance with the operation conditions. The reservoir 5 has the function of absorbing the amount of change in the refrigerant required in the refrigerant circuit by storing an excess of the refrigerant. Here, both the liquid refrigerant and the gas refrigerant exist in the reservoir 5, and the inside of the reservoir 5 is in a two-phase gas-liquid state. Because the refrigerant becomes a two-phase gas-liquid state in midstream in the refrigerant path inside the condenser 3, the temperature sensor 15a may be disposed in a location where it can detect the temperature of the refrigerant in the two-phase gas-liquid state inside the condenser 3.

The controller 20 is configured to perform processing of controlling the rotation speed of the compressor 2, the rotation speed of the condenser fan 4, the rotation speed of the first subcooling device fan 7, the opening degree of the expansion valve 9, the opening degree of the flow control valve 12, and the like on the basis of signals relating to detection by the temperature sensors 15a to 15d and other various sensors (not illustrated) and to appropriately operate the refrigeration apparatus 1.

Next, the function in each of the subcooling devices in Embodiment 1 is described. The subcooling device has the function of bringing the refrigerant into a subcooled state and uses the degree of subcooling and the amount of cooling as its indices. The degree of subcooling in each subcooling device can be represented by the following expressions (1) and (2).

[Math. 1]

(Degree of subcooling on outlet of first subcooling device 6)=(Value detected by temperature sensor 15a)−(Value detected by temperature sensor 15b)  (1)

[Math. 2]

(Degree of subcooling on outlet of second subcooling device 8)=(Value detected by temperature sensor 15a)−(Value detected by temperature sensor 15c)  (2)

The amount of cooling in each subcooling device can be represented by the following expressions (3) and (4).

[Math. 3]

(Amount of cooling in first subcooling device 6)= (Specific heat at constant pressure of refrigerant)×(Amount of circulation of refrigerant)×{
(Value detected by temperature sensor 15a)−
(Value detected by temperature sensor 15b)} (3)

[Math. 4]

(Amount of cooling in second subcooling device
 8)=(Specific heat at constant pressure of refrigerant)×(Amount of circulation of refrigerant)×{
(Value detected by temperature sensor 15b)−
(Value detected by temperature sensor 15c)} (4)

The ratio of the amount of cooling in the second subcooling device 8 to the total amount of cooling can be represented by the following expression (5). The total amount of cooling is a value that does not include the amount of cooling in the condenser 3 and that is the sum of the amount of cooling in the first subcooling device 6 and the amount of cooling in the second subcooling device 8. Hereinafter, the ratio of the amount of cooling in the second subcooling device 8 to the total amount of cooling is referred to as the subcooling ratio.

[Math. 5]

(Ratio of amount of cooling in second subcooling
 device 8 to total amount of cooling)={(Value
 detected by temperature sensor 15b)−(Value
 detected by temperature sensor 15c)}/{(Value
 detected by temperature sensor 15a)−(Value
 detected by temperature sensor 15c)} (5)

The advantages provided by the functions of the subcooling devices are described below. The degree of subcooling of the refrigerant in the refrigeration cycle is defined by the difference between the refrigerant temperature at the point E in FIG. 2 and the refrigerant temperature at the point G. When the degree of subcooling of the refrigerant increases, the side GH moves toward a low enthalpy side. Here, COP (=cooling capacity/electrical input (power consumption)) indicating the efficiency of the refrigeration apparatus 1 increases as the shape of the refrigeration cycle becomes similar to a horizontally long rectangle (the enthalpy difference increases and the difference between high pressure and low pressure decreases). Accordingly, COP increases with an increase in the degree of subcooling of the refrigerant. Increasing the degree of subcooling is restricted because it is necessary to increase the size of the subcooling device, increase the electrical input, and the like in accordance with the degree of subcooling to be achieved. Thus the devices have individual degrees of subcooling of refrigerant to achieve high COPs.

In the refrigeration apparatus 1 in Embodiment 1, the first subcooling device 6, which is an air heat exchanger, cannot make the refrigerant have a temperature at or below the outdoor air temperature. To bring the refrigerant temperature close to the outdoor air temperature, a significantly large amount of air conveyed is necessary, and thus an electrical input therefor is also required. The second subcooling device 8, which is a refrigerant-refrigerant heat exchanger, cannot make the refrigerant have a temperature at or below the saturated temperature in medium pressure. To bring the refrigerant close to the saturated temperature in medium pressure, a significantly large amount of the refrigerant conveyed is necessary, and thus an electrical input therefor is also required. Here, the medium pressure depends on the compressor 2. If thermally insulating the refrigerant pipes in the refrigeration apparatus 1 are not sufficient, when the temperatures of the refrigerant pipes are at or below a dew point of the outdoor air, undesired dew condensation or freezing would occur. The above-described limitations may restrict the degree of subcooling of the refrigerant.

The subcooling ratio in each subcooling device varies depending on the operation conditions when the degree of subcooling for achieving high COP exists. This is described next. As previously explained, the performance of the air heat exchanger depends on the outdoor air temperature. The performance of the refrigerant-refrigerant heat exchanger depends on medium pressure. The medium pressure is influenced by high pressure and low pressure. Here, the high pressure depends on the condenser 3, condensation of the refrigerant is influenced by the outdoor air temperature, and thus the performance of the refrigerant-refrigerant heat exchanger is indirectly influenced by the outdoor air temperature.

Figure 3A:
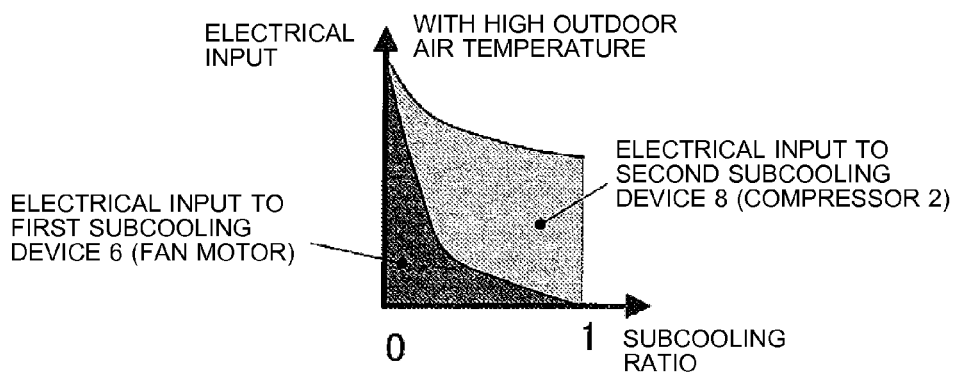
FIG. 3A illustrates a relationship among an outdoor air temperature, electrical input, and subcooling ratio in the refrigeration apparatus 1 according to Embodiment 1 of the invention (case 1).
Figure 3B:
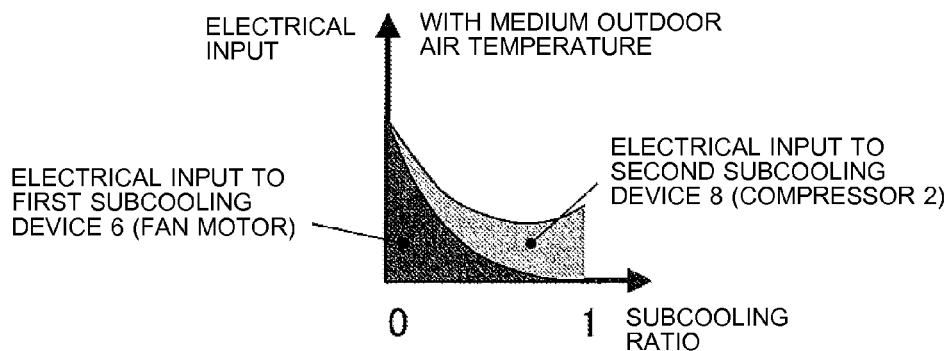
FIG. 3B illustrates a relationship among the outdoor air temperature, electrical input, and subcooling ratio in the refrigeration apparatus 1 according to Embodiment 1 of the invention (case 2).
Figure 3C:
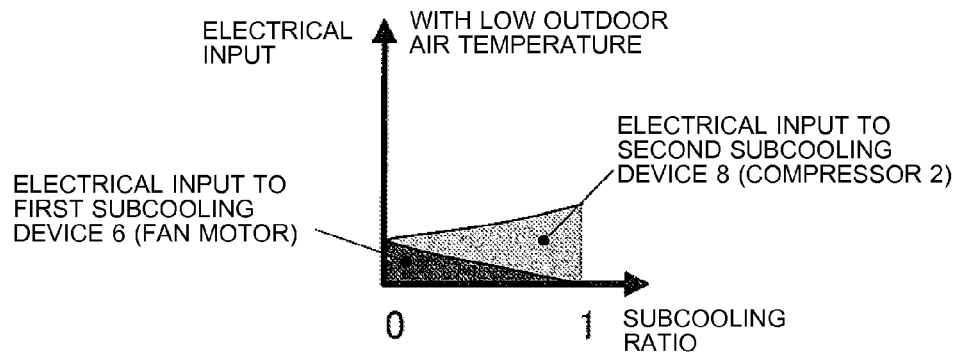
FIG. 3C illustrates a relationship among the outdoor air temperature, electrical input, and subcooling ratio in the refrigeration apparatus 1 according to Embodiment 1 of the invention (case 3).

FIGS. 3A to 3C illustrate relationships among the outdoor air temperature, electrical input, and subcooling ratio in the refrigeration apparatus 1 according to Embodiment 1 of the invention. The horizontal axis indicates the subcooling ratio, which is the ratio of the amount of heat exchanged in the second subcooling device 8 to the total amount of cooling. The vertical axis indicates the electrical input required for each of the first subcooling device 6 and the second subcooling device 8. Here, the electrical input required for the first subcooling device 6 is the power required for the first subcooling device fan 7. The electrical input required for the second subcooling device 8 is the power corresponding to (enthalpy at point D−enthalpy at point C)×(amount of refrigerant passing through bypass path 11) in FIG. 2 of the electrical input in the compressor 2. The outdoor air temperatures in FIG. 3 are high, medium, and low. Here, the high, medium, and low temperatures are based on relative comparison of the outdoor air temperatures.

FIG. 3A illustrates a case where the outdoor air temperature is high. Because heat transferred from the refrigerant to the air corresponds to the amount of cooling, when the outdoor air temperature increases, the amount of heat transferred decreases and the heat exchange performance decreases. When the outdoor air temperature is high, the refrigeration capacity (load) tends to increase. Thus the decrease in the heat exchange performance is further promoted. Accordingly, a typical way to reduce the subcooling ratio is to significantly increase the volume of air supplied by the first subcooling device fan 7 to the first subcooling device 6. The electrical input has substantially the same tendency. A typical way to increase the subcooling ratio is to increase the amount of the refrigerant passing through the bypass path 11 in the second subcooling device 8. At this time, the electrical input monotonously decreases. Therefore, the electrical input required to subcool the refrigerant monotonously decreases with an increase in the subcooling ratio.

FIG. 3B illustrates a case where the outdoor air temperature is medium. The heat exchange performance of the first subcooling device 6 in this case is higher than that in the case where the outdoor air temperature is high. Thus the electrical input in this medium-temperature case is smaller than that in the case where the outdoor air temperature is high. Here, a typical way to reduce the subcooling ratio is to increase the volume of air supplied by the first subcooling device fan 7 to the first subcooling device 6, as in the case where the outdoor air temperature is high. The electrical input also tends to monotonously decrease. In contrast, when the subcooling ratio is increased, the electrical input exponentially decreases with respect to the volume of air supplied by the first subcooling device fan 7 to the first subcooling device 6. The proportion of the electrical input in the first subcooling device fan 7 (fan motor) in the electrical input decreases, and the electrical input in the second subcooling device 8 (compressor 2) is dominant. Because the amount of circulation in the bypass path 11 in the second subcooling device 8 increases, the electrical input in the second subcooling device 8 (compressor 2) monotonously increases. Thus the electrical input required for subcooling has a minimum value. When the outdoor air temperature increases, the influence of the increase in the electrical input caused by the increase in the volume of air, as illustrated in FIG. 3A, becomes strong, and the subcooling ratio corresponding to the minimum value increases.

FIG. 3C illustrates a case where the outdoor air temperature is low. When the outdoor air temperature is low, the heat exchange performance further increases. To reduce the subcooling ratio, the volume of air supplied by the first subcooling device fan 7 to the first subcooling device 6 and the electrical input monotonously increases. In contrast, a typical way to increase the subcooling ratio is to increase the amount of circulation in the bypass path 11 in the second subcooling device 8, and the electrical input monotonously increases. The load in the refrigeration apparatus 1 tends to decrease with a reduction in the outdoor air temperature. Thus the input in the compressor 2 also decreases, but the proportion of the input in the compressor 2 to the electrical input in the refrigeration apparatus 1 increases. When the subcooling ratio increases, the ratio of the input in the compressor 2 to the total also increases. Thus the electrical input required for subcooling monotonously increases with respect to the subcooling ratio.

Figure 4:
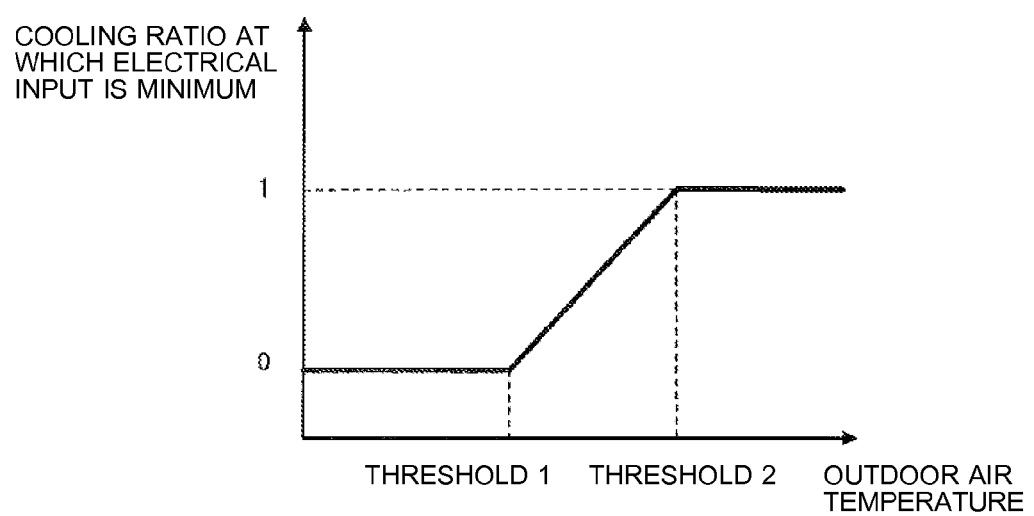
FIG. 4 illustrates a relationship between the outdoor air temperature and the subcooling ratio at which the electrical input is a minimum in the refrigeration apparatus 1 according to Embodiment 1 of the invention.

FIG. 4 illustrates a relationship between the outdoor air temperature and the subcooling ratio at which the electrical input in the refrigeration apparatus 1 according to Embodiment 1 of the invention is a minimum. The subcooling ratio at which the electrical input is a minimum to achieve high COP with respect to the outdoor air temperature based on FIG. 3 is illustrated in FIG. 4. Here, thresholds 1 and 2 in FIG. 4 are influenced by the first subcooling device 6, the second subcooling device 8, and the compressor 2. When the specifications of these devices are determined, the subcooling ratio can be grasped in advance by estimation or trial calculation. For the subcooling ratio at which the electrical input is a minimum, values of 0 and 1 are not exact and may be values close to 0 and 1 (nearly 0 and 1).

Figure 5:
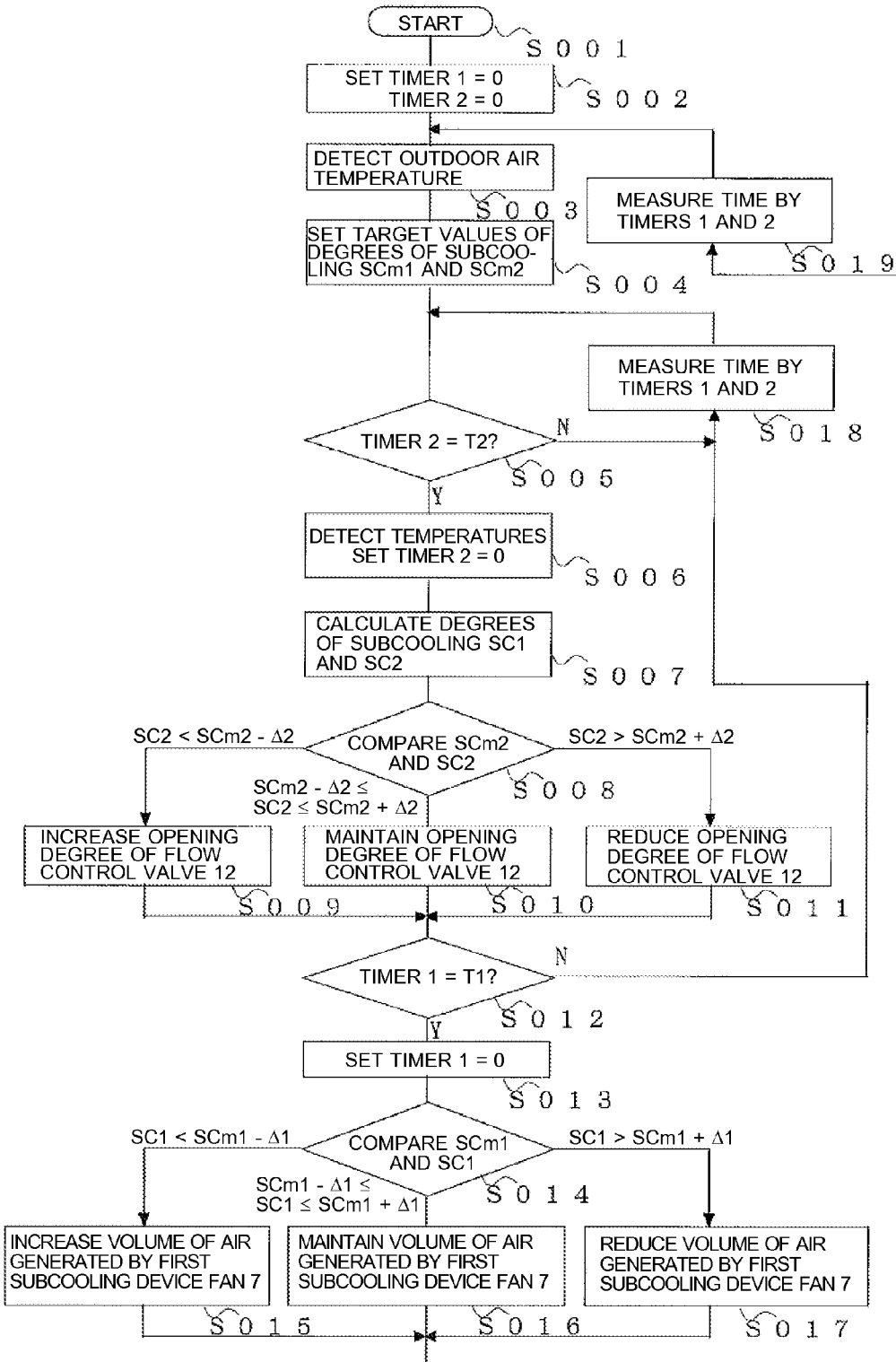
FIG. 5 illustrates a process of subcooling control performed by the refrigeration apparatus 1 according to Embodiment 1 of the invention.

FIG. 5 illustrates a process of subcooling control performed by the refrigeration apparatus 1 according to Embodiment 1 of the invention. Next, specific actions in the subcooling devices are described on the basis of the flowchart in FIG. 5. Here, times T1 and T2 are pre-set times, and the time T1 is (two or more times) larger than the time T2.

In S001, the subcooling control starts. Then in S002, timers 1 and 2 are set to 0 (reset). In S003, the outdoor air temperature is detected on the basis of a signal from the temperature sensor 15*d*. In S004, target value SCm1 of the degree of subcooling on the refrigerant flow outlet of the first subcooling device 6 and target value SCm2 of the degree of subcooling on the outlet of the second subcooling device 8 are set on the basis of the detected outdoor air temperature. The subcooling ratio corresponding to high COP is determined on the basis of FIG. 4, and the target values SCm1 and SCm2 are set from the determined subcooling ratio.

In S005, it is determined whether the timer 2 has reached (exceeded) the time T2. When it is determined that the timer 2 has reached the time 2, the temperatures are detected by the sensors 15 and the timer 2 is set to 0 (reset) in S006. In S007, degree of subcooling SC1 on the refrigerant flow outlet of the first subcooling device 6 and degree of subcooling SC2 on the refrigerant flow outlet of the second subcooling device 8 are calculated. When it is determined that the timer 2 has not reached the time 2, time is counted by the timers 1 and 2 in S018.

In S008, SC2 and SCm2 are compared. When it is determined that SC2<SCm2−Δ2, the opening degree of the flow control valve 12 is increased in S009. When it is determined that SCm2−Δ2≤SC2≤SCm2+Δ2, the opening degree of the flow control valve 12 is maintained in S010. When it is determined that SC2>SCm2+Δ2, the opening degree of the flow control valve 12 is reduced in S011.

After the opening degree of the flow control valve 12 is determined, it is determined whether the timer 1 has reached (exceeded) the time 1 in S012. When it is determined that the timer 1 has reached (exceeded) the time 1, the timer 1 is set to 0 (reset) in S013. When it is determined that the timer 1 has not reached the time 1, time is counted by the timers 1 and 2 in S018.

In S014, SC1 and SCm1 are compared. When it is determined that SC1<SCm1−Δ1, the rotation speed of the first subcooling device fan 7 is increased and the volume of air is increased in S015. When it is determined that SCm1−Δ1≤SC1≤SCm1+Δ1, the rotation speed of the first subcooling device fan 7 is maintained and the volume of air is maintained in S016. When it is determined that SC1>SCm1+Δ1, the rotation speed of the first subcooling device fan 7 is reduced and the volume of air is reduced.

After the rotation speed of the first subcooling device fan 7 is determined, time is counted (measured) by the timers 1 and 2 in S019.

As described above, according to the refrigeration apparatus 1 in Embodiment 1, the amount of heat exchanged in the first subcooling device 6 and that in second subcooling device 8 are controlled and the subcooling ratio is changed in accordance with the outdoor air temperature. Thus the electrical input can be suppressed in accordance with the operation conditions, and COP can be increased. Accordingly, both the rating condition and the annual power consumption throughout the year for the refrigeration apparatus 1 can be reduced. Because a time interval for controlling the first subcooling device 6 and that for the second subcooling device 8 are different, there is no mutual interference and stable control can be achieved. Here, an air heat exchanger has a larger thermal capacity and slower time response than those in a refrigerant-refrigerant heat exchanger. Thus the stability of the control can be further enhanced by setting the control time interval for the first subcooling device 6, which is the air heat exchanger, to a value longer than the control time interval for the second subcooling device 8, which is the refrigerant-refrigerant heat exchanger.

Embodiment 2

FIG. 6 illustrates a configuration of a refrigeration cycle apparatus according to Embodiment 2 of the invention. The refrigeration apparatus 1 is also described in Embodiment 2. In Embodiment 1, as illustrated in FIG. 1, the pipes are connected such that the refrigerant streams in two paths (first path 8*a* and second path 8*b*) in the second subcooling device 8 are counter streams. In the refrigeration apparatus 1 in Embodiment 2, as illustrated in FIG. 6, the pipes are connected such that the refrigerant streams are parallel streams. For example, when parallel streams of the refrigerant relating to heat exchange flow in in the second subcooling device 8, in the case where the degree of subcooling of the refrigerant is achieved by the subcooling devices, the amount of heat exchanged in the second subcooling device 8 can be reduced as compared with that in the refrigeration apparatus 1 in FIG. 1.

The elements having the same reference numerals in FIG. 6 as in FIG. 1 and the like perform similar actions and the like to those described in Embodiment 1. A temperature sensor 15e is configured to detect the temperature of the refrigerant passing through the flow control valve 12 and then flowing into the second path 8b in the second subcooling device 8. A temperature sensor 15f is configured to detect the temperature of the refrigerant exiting from the second path 8b in the second subcooling device 8 and then flowing through the bypass path 11.

In the case of the refrigeration apparatus 1 in Embodiment 2, the refrigerant passing through the first subcooling device 6 branches before the first path 8a in the second subcooling device 8. Thus the amount of the refrigerant passing through the first subcooling device 6 and that passing through the first path 8a in the second subcooling device 8 are different. Accordingly, the subcooling ratio is described below.

[Math. 6]

(Degree of subcooling on outlet of first subcooling device 6)=(Value detected by temperature sensor 15a)−(Value detected by temperature sensor 15b)   (6)

[Math. 7]

(Degree of subcooling on outlet of second subcooling device 8)=(Value detected by temperature sensor 15a)−(Value detected by temperature sensor 15c)   (7)

[Math. 8]

(Amount of cooling in first subcooling device 6)=(Specific heat at constant pressure of refrigerant)×(Amount of refrigerant passing through first subcooling device 6)×{(Value detected by temperature sensor 15a)−(Value detected by temperature sensor 15b)}   (8)

[Math. 9]

(Amount of cooling in second subcooling device 8)=(Specific heat at constant pressure of refrigerant)×(Amount of refrigerant passing through first path 8a in second subcooling device)×{(Value detected by temperature sensor 15b)−(Value detected by temperature sensor 15c)}   (9)

[Math. 10]

(Amount of cooling in second subcooling device 8)=(Amount of circulation of refrigerant in second path 8b in second subcooling device 8)×{(Enthalpy determined by value detected by temperature sensor 15b)−(Enthalpy determined by saturated pressure determined by value detected by temperature sensor 15e and value detected by temperature sensor 15f)}   (10)

[Math. 11]

(Supercooling ratio)=1−1/(1+A·B)

where $A$={(Value detected by temperature sensor 15b)−(Value detected by temperature sensor 15c)}/{(Value detected by temperature sensor 15b)−(Value detected by temperature sensor 15a)}

$B$=1−(Specific heat at constant pressure of refrigerant)×{(Value detected by temperature sensor 15b)−(Value detected by temperature sensor 15c)}/{(Enthalpy determined by value detected by temperature sensor 15b)−(Enthalpy determined by saturated pressure determined by value detected by temperature sensor 15e and value determined by temperature sensor 15f)+(Specific heat at constant pressure of refrigerant)×{(Value detected by temperature sensor 15b)−(Value detected by temperature sensor 15c)}

As described above, according to Embodiment 2, even when the parallel streams of the refrigerant flow in the second subcooling device 8, because the subcooling ratio can be changed in accordance with the outdoor air temperature, the electrical input can be suppressed in accordance with the operation conditions and COP can be increased. Accordingly, both the rating condition and the annual power consumption throughout the year for the refrigeration apparatus 1 can be reduced.

Embodiment 3

Figure 7:
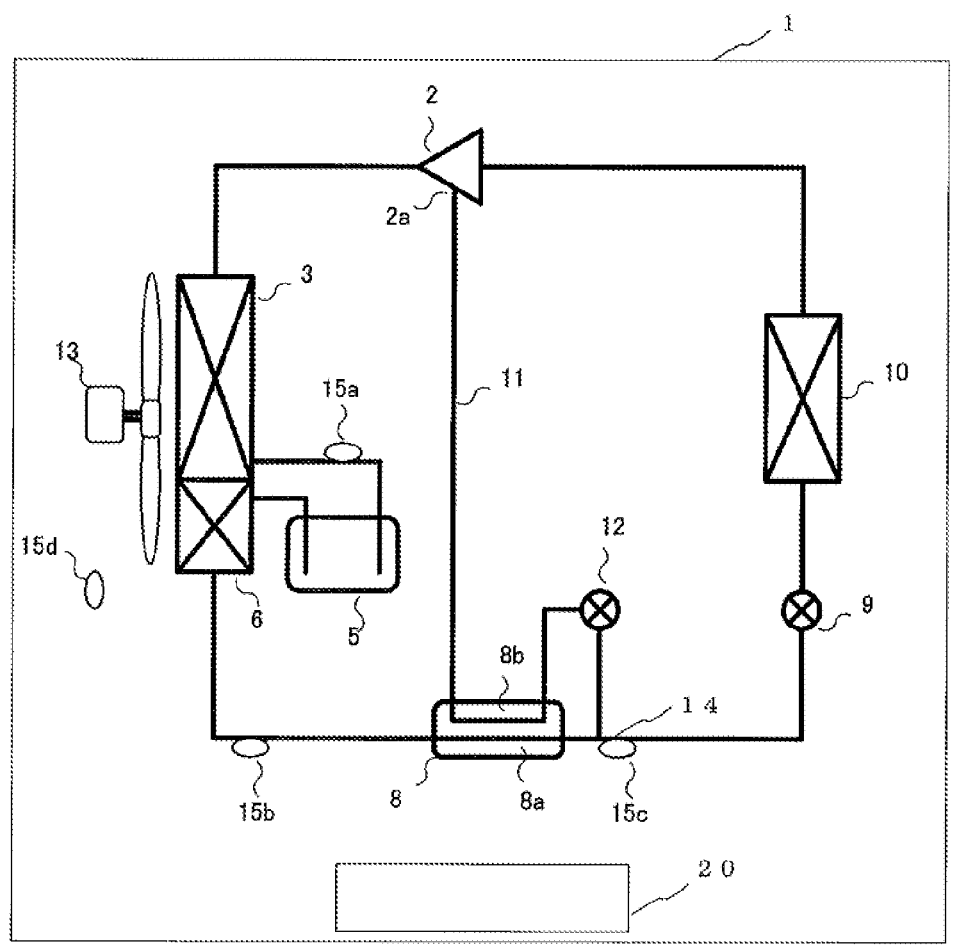
FIG. 7 illustrates a configuration of a refrigeration cycle apparatus according to Embodiment 3 of the invention.

FIG. 7 illustrates a configuration of a refrigeration cycle apparatus according to Embodiment 3 of the invention. The refrigeration apparatus 1 is also described in Embodiment 3. The elements having the same reference numerals in FIG. 7 as in FIG. 1 and the like perform similar actions and the like to those described in Embodiment 1 and the like. A fan 13 produces an air flow along which the outdoor air for exchanging heat with the refrigerant in the condenser 3 and the first subcooling device 6 is delivered.

For example, the refrigeration apparatus 1 in Embodiment 1 includes the condenser fan 4 and the first subcooling device fan 7 and can individually adjust the amount of the outdoor air to be conveyed to the condenser 3 and the amount of the outdoor air to be conveyed to the first subcooling device 6. In the refrigeration apparatus 1 in Embodiment 3, because the outdoor air can be conveyed to both the condenser 3 and the first subcooling device 6 at the same air velocity, it is impossible to individually adjust the amount of air conveyed to the condenser 3 and that to the first subcooling device 6.

Here, the condenser 3 has the function of maintaining high pressure in the refrigeration cycle constant. This function is more important than subcooling the refrigerant in the first subcooling device 6 because the amount of the refrigerant passing through the evaporator 10 is larger than the amount of the refrigerant passing through the bypass path 11 and its proportion in the input into the compressor 2 is large, controlling the high pressure determined in the condenser 3 enhances the advantage of reduction with respect to the input into the compressor 2, and this is more important to the efficiency of the refrigeration apparatus 1. Accordingly, the cooling ratio at which the input is a minimum in FIG. 4 is increased. When the outdoor air temperature is low, the heat exchange performance of the condenser 3 is good, and the proportion of the electrical input into the compressor 2 in the entire electrical input in the refrigeration apparatus 1 is increased. Thus there is a tendency in which the electrical input can be minimized with a reduction in the subcooling ratio, and this tendency is the same as in Embodiment 1.

As described above, even when the condenser 3 and the first subcooling device 6 share the same fan 13, because the subcooling ratio can be changed with the outdoor air temperature, the electrical input can be suppressed in accordance with the operation conditions and COP can be increased. Accordingly, both the rating condition and the annual power consumption throughout the year for the refrigeration apparatus 1 can be reduced.

Embodiment 4

For example, in the above-described Embodiment 1 and the like, the injection pipe 2a in the compressor 2 and the bypass path 11 are connected by a pipe, and the refrigerant can be injected into the compressor 2. Other configurations may also be used. For example, the refrigerant pipe between the compressor 2 and the evaporator 10 and the bypass path 11 may be connected by a pipe. In this case, the same advantage is also obtainable. Because the injection pipe 2a in the compressor 2 is not needed, the cost can be reduced.

In Embodiments 1 to 3, only the temperature sensors 15 are used as the detecting means. The invention is not limited to this configuration. In place of some of the temperature sensors, some pressure sensors may be used. For example, in place of the temperature sensor 15a in FIG. 1 described in Embodiment 1, which can detect the temperature relating to two-phase refrigerant (two-phase gas-liquid refrigerant) in the refrigerant circuit, a pressure sensor may be disposed on a high-pressure side. The controller 20 may calculate the saturated temperature on the basis of pressure relating to detection by the pressure sensor. Similarly, in place of the temperature sensor 15e in FIG. 6 described in Embodiment 2, which can detect the temperature relating to two-phase refrigerant in the refrigerant circuit, a pressure sensor may be disposed on a medium-pressure side, and the controller 20 may calculate the saturated temperature. Because the temperature takes time to change, when detection by the temperature sensors 15 is used, there is a lag in terms of tracking changes. In contrast, the use of pressure, which has fast time response, can improve control convergence.

REFERENCE SIGNS LIST 1 refrigeration apparatus 2 compressor 2a injection pipe 3 condenser 4 condenser fan 5 reservoir 6 first subcooling device 7 first subcooling device fan 8 second subcooling device 8a first path 8b second path 9 expansion valve 10 evaporator 11 bypass path 12 flow control valve 13 fan 14 branch pipe 15, 15a, 15b, 15c, 15d, 15e, 15f temperature sensor 20 controller.

The invention claimed is:

1. A refrigeration cycle apparatus comprising:
a refrigerant circuit formed by connecting refrigerant pipes, a compressor, a condenser, a first subcooling device, a second subcooling device, a flow controller, a bypass pipe, a pressure reducing device, and an evaporator,
the compressor configured to compress refrigerant;
the condenser configured to condense the refrigerant;
the first subcooling device configured to cause heat exchange between the refrigerant and an air and to subcool the refrigerant;
the second subcooling device configured to cause heat exchange between first and second streams of the refrigerant obtained by branching by a branch pipe for causing the refrigerant to branch off and to subcool the first stream of the refrigerant relating to the branching;
the flow controller configured to adjust a flow rate of the second stream of the refrigerant relating to the branching with an adjustable opening degree of the flow controller and to cause the second stream of the refrigerant to flow through the second subcooling device;
the bypass pipe that allows the refrigerant passing through the flow controller and the second subcooling device to flow therethrough;
the pressure reducing device configured to reduce pressure of the refrigerant;
the evaporator configured to cause the refrigerant to evaporate;
a fan configured to convey the air to the first subcooling device; and
a controller configured to
control an amount of heat exchanged in the first subcooling device by controlling a rotation speed of the fan to control an amount of the air exchanging heat with the refrigerant in the first subcooling device based on a temperature of the air,
control an amount of heat exchanged in the second subcooling device by controlling the opening degree of the flow controller based on the temperature of the air,
change a subcooling ratio which is a ratio of an amount of cooling in the second subcooling device to a total amount of cooling which is a sum of an amount of cooling in the first subcooling device and the amount of cooling in the second subcooling device, such that in accordance with a decrease in the temperature of the air, the controller controls to decrease the subcooling ratio by performing control of the rotation speed of the fan and/or performing control of the opening degree of the flow controller such that, in accordance with the decrease in the temperature of the air, the amount of heat exchanged in the first subcooling device becomes larger as compared to the amount of heat exchanged in the second subcooling device in an operation after activation of the refrigeration cycle apparatus.

2. The refrigeration cycle apparatus of claim 1, wherein the controller is further configured to control the opening degree of the flow controller of the second subcooling device at control time intervals shorter than those for controlling the rotation speed of the fan of the first subcooling device.

3. The refrigeration cycle apparatus of claim 1, wherein the compressor includes an injection pipe and is capable of receiving an incoming refrigerant through the injection pipe in an intermediate section in a compression stroke and of discharging the refrigerant therefrom, and
the bypass pipe is connected to the injection pipe.

4. The refrigeration cycle apparatus of claim 1, wherein the bypass pipe is connected to a pipe on a suction side of the compressor.

5. The refrigeration cycle apparatus of claim 4, wherein the bypass pipe connected to the pipe on the suction side of the compressor extends from the second subcooling device to the suction side of the compressor.

6. The refrigeration cycle apparatus of claim 1, further comprising a shared fan configured to convey the air to both the condenser and the first subcooling device.

7. The refrigeration cycle apparatus of claim 1, wherein the controller is further configured to
selectively adjust the subcooling ratio which is the ratio of an amount of cooling in the second subcooling device to the total amount of cooling in both the first subcooling device and the second subcooling device to suppress an electrical input requirement of both the fan and the compressor.

8. The refrigeration cycle apparatus of claim 1, further comprising
a condenser fan configured to convey air to the condenser configured to condense the refrigerant, wherein
the controller is configured to selectively control the condenser fan of the condenser and the fan of the first subcooling device.

9. The refrigeration cycle apparatus of claim 1, further comprising a reservoir fluidly connected to the refrigerant circuit at a position in the refrigerant circuit between the condenser and the first subcooling device, wherein the first subcooling device is directly connected to both the reservoir and the second subcooling device in the refrigerant circuit.

10. The refrigeration cycle apparatus of claim 1, wherein the controller is configured to set a first control-time interval to control the rotation speed of the fan of the first subcooling device and a second control-time interval to control the opening degree of the flow controller of the second subcooling device, and the controller is further configured to set the first control-time interval of the first subcooling device to be different than the second control-time interval of the second subcooling device.

11. The refrigeration cycle apparatus of claim 10, wherein the controller is further configured to set the first control-time interval of the first subcooling device to be longer than the second control-time interval of the second subcooling device.

* * * * *